United States Patent
Kitamura

(10) Patent No.: US 7,999,981 B2
(45) Date of Patent: Aug. 16, 2011

(54) METHOD AND DEVICE FOR MANUFACTURING A HOLOGRAM RECORDING MEDIUM

(75) Inventor: Mitsuru Kitamura, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 0 days.

(21) Appl. No.: 12/727,466

(22) Filed: Mar. 19, 2010

(65) Prior Publication Data

US 2010/0188717 A1 Jul. 29, 2010

Related U.S. Application Data

(62) Division of application No. 11/811,600, filed on Jun. 11, 2007, now Pat. No. 7,706,038.

(30) Foreign Application Priority Data

Jun. 14, 2006 (JP) .................................. 2006-164331

(51) Int. Cl.
G03H 1/08 (2006.01)
(52) U.S. Cl. .......................................................... 359/9
(58) Field of Classification Search ........................ 359/9
See application file for complete search history.

(56) References Cited

U.S. PATENT DOCUMENTS

| 4,778,262 | A * | 10/1988 | Haines ............... 359/9 |
| 5,784,200 | A | 7/1998 | Modegi |
| 6,618,190 | B2 | 9/2003 | Kitamura et al. |
| 6,934,074 | B2 | 8/2005 | Kitamura et al. |
| 7,221,496 | B2 | 5/2007 | Kitamura |
| 7,489,435 | B2 | 2/2009 | Kitamura |
| 7,492,498 | B2 | 2/2009 | Kitamura |
| 7,492,499 | B2 | 2/2009 | Kitamura |
| 7,492,500 | B2 | 2/2009 | Kitamura |
| 7,492,501 | B2 | 2/2009 | Kitamura |
| 7,573,622 | B2 | 8/2009 | Kitamura |

(Continued)

FOREIGN PATENT DOCUMENTS

JP 2001-109362 A 4/2001

(Continued)

OTHER PUBLICATIONS

Office Action issued on Jan. 18, 2011 from the Japanese Patent Office in connection with a counterpart Japanese Patent Application 2006-164331.

(Continued)

*Primary Examiner* — Alessandro Amari
(74) *Attorney, Agent, or Firm* — Ladas & Parry LLP

(57) ABSTRACT

Arrangements are made to enable different original images to be reproduced upon observation from different positions and yet enable reproduced images of high resolution to be obtained. In a case of recording two original images, each of the two original images Ia and Ib is defined as a set of point light sources in an XYZ global coordinate system, and two propagation spaces Sa and Sb, each enabling propagation of light emitted from an origin Q of an $\alpha\beta\gamma$ local coordinate system, are defined. A predetermined recording plane and a reference light are set in the XYZ coordinate system, and an interference fringe pattern, which is formed on the recording plane by object light components from the point light sources constituting the respective original images and the reference light, is determined by computation. In this process, the computation is performed upon deeming that a light from a point light source belonging to the original image Ia spreads only within the propagation space Sa, with the origin Q of the $\alpha\beta\gamma$ coordinate system being overlappingly set at the position of the point light source, and that a light from a point light source belonging to the original image Ib spreads only within the propagation space Sb, with the origin Q of the $\alpha\beta\gamma$ coordinate system being overlappingly set at the position of the point light source.

2 Claims, 9 Drawing Sheets

U.S. PATENT DOCUMENTS

2003/0151784 A1  8/2003  Kitamura et al.
2004/0240007 A1  12/2004  Kitamura

FOREIGN PATENT DOCUMENTS

JP  2002-72837 A  3/2002
JP  2006-65340 A  3/2006

OTHER PUBLICATIONS

Espacenet English abstract of JP 2001-109362 A.
Espacenet English abstract of JP 2002-72837 A.
Espacenet English abstract of JP 2006-65340 A.

* cited by examiner

METHOD AND DEVICE FOR MANUFACTURING A HOLOGRAM RECORDING MEDIUM

This application is a divisional of application Ser. No. 11/811,600 filed on Jun. 11, 2007, now U.S. Pat. No. 7,706,038 claims the benefit thereof and incorporates the same by reference.

BACKGROUND OF THE INVENTION

The present invention relates to a method and a device for manufacturing a hologram recording medium and particularly relates to arts for manufacturing a hologram recording medium that is arranged to reproduce different original images when observed from different positions.

Holograms have come to be widely used in applications for preventing counterfeiting of cash vouchers and credit cards. Normally, a region onto which a hologram is to be recorded is set up in a portion of a medium to be subject to counterfeiting prevention, and a hologram of a three-dimensional image, etc., is recorded inside this region.

With many holograms that are currently utilized commercially, an original image is recorded onto a medium in the form of interference fringes by an optical method. That is, a method is employed in which an object that forms an original image is prepared and light from the object and a reference light are guided by a lens or other optical system to a recording surface, coated with a photosensitizing agent, to form interference fringes on the recording surface. Although this optical method requires an optical system of considerably high precision to obtain a clear image, it is the most direct method for obtaining a hologram and is the most widely practiced method in industry.

Meanwhile, methods for preparing a hologram by forming interference fringes on a recording surface by computation using a computer have come to be known recently, and a hologram prepared by such a method is generally referred to as a "computer generated hologram (CGH)" or simply as a "computer hologram." A computer hologram is obtained by simulating an optical interference fringe generating process on a computer, and an entire process of generating an interference fringe pattern is carried out in the form of computation on the computer. Upon obtaining image data of an interference fringe pattern by such a computation, physical interference fringes are formed on an actual medium based on the image data. As a specific example, a method, with which image data of an interference fringe pattern prepared by a computer are provided to an electron beam printer and physical interference fringes are formed by scanning an electron beam across a medium, has been put to practical use.

With a hologram recording medium, an original image can be recorded three-dimensionally and the original image can be observed from different angles by changing the viewpoint position. Thus, a major characteristic of a hologram recording medium is that a three-dimensional image can be recorded on a flat surface. Also, recently, hologram recording media, with a further characteristic that a completely different original image is reproduced when observed from a different angle, are being utilized commercially. For example, Japanese Patent Laid-open Publication No. 2001-109362A discloses a method that employs a computer generating hologram method to manufacture a hologram recording medium with which different original images can be reproduced by changing the viewpoint position.

As mentioned above, methods for manufacturing a hologram recording medium, with which different original images can be reproduced when observed from different positions, are already as known as conventional arts. However, because the basic principle of the conventional methods is to set up a plurality of regions on a hologram recording surface and record a different original image on each individual region, there is the problem that the reproduced images are lowered in resolution.

For example, the abovementioned Patent Document discloses a method in which a hologram recording surface is partitioned into a plurality of strip-like regions, each strip-like region is associated with one original image among a plurality of mutually different original images, and on a single strip-like region, only the one original image that is associated with the strip-like region is recorded. Specifically, in a case where three original images are to be recorded, a recording method is employed in which a first original image is recorded on a 1st, 4th, 7th, 10th strip-like regions, etc., a second original image is recorded on a 2nd, 5th, 8th, 11th strip-like regions, etc., and a third original image is recorded on a 3rd, 6th, 9th, 12th strip-like regions, etc. In this case, each of the three original images is recorded in the form of interference fringes and by differing the direction of the reference light according to each original image in this process, a specific original image is made to be reproduced upon observation from a specific position.

However with the above example, because, for example, the first original image is recorded only on the 1st, 4th, 7th, 10th strip-like regions, etc., and information on the first original image are left out from the 2nd, 3rd, 5th, 6th, 8th, 9th, 11th, 12th strip-like regions, etc., the resolution of the reproduced image is reduced to ⅓ that of the original. Thus, as long as the principle of recording a different original image on each individual region is employed, the problem of lowering the resolution of the reproduced image occurs.

SUMMARY OF THE INVENTION

Thus, an object of the present invention is to provide a method and a device for manufacturing a hologram recording medium, with which different original images are reproduced when observed from different positions and yet with which reproduced images of high resolution can be obtained.

(1) The first feature of the invention resides in a method for manufacturing a hologram recording medium that has an arrangement by which different original images are reproduced when observed from different positions, the hologram recording medium manufacturing method comprising:

an original image preparation step of preparing a plurality N of original images, each as a set of unit light sources positioned in a three-dimensional coordinate system;

a propagation space definition step of defining a plurality N of propagation spaces, enabling propagation of light emitted from a reference unit light source, based on a position of the reference unit light source;

a recording plane setting step of setting a predetermined recording plane in the three-dimensional coordinate system;

a reference light setting step of setting a predetermined reference light in the three-dimensional coordinate system;

a pattern computation step of computing an interference fringe pattern, formed on the recording plane, based on object light components, emitted from the individual unit light sources constituting the respective original images, and the reference light; and a pattern forming step of forming the interference fringe pattern on a physical medium; and wherein in the pattern computation step, a computation is performed upon deeming that an object light from a unit light source belonging to an i-th (i=1, 2, . . . , N) original image propagates only within an i-th (i=1, 2, . . . , N) propagation space, with a position of the unit light source being set as a position of the reference unit light source.

(2) The second feature of the invention resides in a hologram recording medium manufacturing method according to the first feature, wherein in the pattern computation step, a synthetic object light is determined by synthesizing object light components emitted from the individual unit light sources constituting the respective original images, and an interference fringe pattern that is obtained on the recording plane by the interference of the synthetic object light and the reference light is computed.

(3) The third feature of the invention resides in a hologram recording medium manufacturing method according to the first or second feature, wherein in the pattern forming step, the interference fringe pattern, obtained by the pattern computation step, is converted into a binary image pattern and the binary image pattern is formed on a physical medium.

(4) The fourth feature of the invention resides in a method for manufacturing a hologram recording medium that has an arrangement by which different original images are reproduced when observed from different positions, the hologram recording medium manufacturing method comprising:

an original image preparation step of preparing a plurality N of original images, each as a set of unit light sources positioned in a three-dimensional coordinate system;

a propagation space definition step of defining a plurality N of propagation spaces, enabling propagation of light emitted from a reference unit light source, based on a position of the reference unit light source;

a recording plane setting step of setting a predetermined recording plane in the three-dimensional coordinate system;

a pattern computation step of computing a complex amplitude pattern formed on the recording plane by synthesis of object light components emitted from the individual unit light sources constituting the respective original images; and a pattern forming step of forming the complex amplitude pattern on a physical medium; and wherein in the pattern computation step, a computation is performed upon deeming that an object light from a unit light source belonging to an i-th (i=1, 2, . . . , N) original image propagates only within an i-th (i=1, 2, . . . , N) propagation space, with a position of the unit light source being set as a position of the reference unit light source.

(5) The fifth feature of the invention resides in a hologram recording medium manufacturing method according to the fourth feature, wherein in the pattern computation step, a plurality of computation points are defined discretely on the recording plane and an amplitude and a phase of a synthetic object light at a predetermined sampling time point is determined for each of computation point positions to determine a complex amplitude pattern as a discrete distribution of amplitudes and phases.

(6) The sixth feature of the invention resides in a hologram recording medium manufacturing method according to the fifth feature, wherein in the pattern forming step, a cell, formed of a three-dimensional structure, is positioned at each individual computation point position and information of an amplitude and a phase concerning the computation point position corresponding to each individual cell are recorded in the three-dimensional structure of the cell.

(7) The seventh feature of the invention resides in a hologram recording medium manufacturing method according to the first to sixth features, wherein in the original image preparation step, a plurality of original images that are positioned so as to partially overlap spatially are prepared.

(8) The eighth feature of the invention resides in a hologram recording medium manufacturing method according to the first to seventh features, wherein in the propagation space definition step, the plurality N of propagation spaces are defined to be regions that are spatially exclusive with respect to each other.

(9) The ninth feature of the invention resides in a hologram recording medium manufacturing method according to the first to seventh features, wherein in the propagation space definition step, a portion or all of the plurality N of propagation spaces are defined to be regions that partially overlap spatially with another propagation space.

(10) The tenth feature of the invention resides in a hologram recording medium manufacturing method according to the first to seventh features, wherein in the propagation space definition step, a portion or all of the plurality N of propagation spaces are defined to be regions that spatially match another propagation space completely.

(11) The eleventh feature of the invention resides in a hologram recording medium manufacturing method according to the first to tenth features, wherein point light sources are used as the unit light sources, and subulate propagation spaces, each having a position of the reference unit light source as an apex, are defined in the propagation space definition step.

(12) The twelfth feature of the invention resides in a hologram recording medium manufacturing method according to the eleventh feature, wherein in the original image preparation step, each original image is prepared as a set of point light sources, defined in an XYZ three-dimensional coordinate system, in the propagation space definition step, subulate propagation spaces, each having an origin of an $\alpha\beta\gamma$ three-dimensional coordinate system as an apex, are defined, and in the pattern computation step, a computation is performed upon setting the origin of the $\alpha\beta\gamma$ three-dimensional coordinate system at a position of a point light source defined in the XYZ three-dimensional coordinate system, overlapping the two coordinate systems so that respective corresponding coordinate axes are parallel, and deeming that an object light from the point light source spreads only within the subulate propagation space.

(13) The thirteenth feature of the invention resides in a hologram recording medium manufacturing method according to the first to tenth features, wherein segment light sources, each formed by aligning a plurality of point light sources along a segment of predetermined length, are used as the unit light sources, and in the propagation space definition step, propagation spaces, each constituted of a geometric logical sum of individual subulate shapes, having positions of the individual point light sources constituting the segment light source as apexes, are defined.

(14) The fourteenth feature of the invention resides in a hologram recording medium manufacturing method according to the first to tenth features, wherein segment light sources are used as the unit light sources, and object light components, each with a wavefront formed of a side surface of a cylindrical column having a segment light source as a central axis, which propagate in a direction perpendicular to the central axis, are defined.

(15) The fifteenth feature of the invention resides in a hologram recording medium manufacturing method according to the first to fourteenth features, wherein in the pattern computation step, the computation is performed upon partitioning the three-dimensional space into a plurality M of plate-like spaces by slicing by a plurality of mutually parallel planes and deeming that an object light from a unit light source in a j-th (j=1, 2, . . . , M) plate-like space, belonging to an i-th (i=1, 2, . . . , N) original image, propagates only within an i-th (i=1, 2, . . . , N) propagation space and within the j-th (j=1, 2, . . . , M) plate-like space.

(16) The sixteenth feature of the invention resides in a method for manufacturing a hologram recording medium that has an arrangement by which different original images are reproduced when observed from different positions, the hologram recording medium manufacturing method comprising:

an original image preparation step of preparing a plurality of original images, each as a set of unit light sources positioned in a three-dimensional coordinate system;

a recording plane setting step of setting a predetermined recording plane in the three-dimensional coordinate system;

a reference light setting step of setting a predetermined reference light in the three-dimensional coordinate system;

a pattern computation step of computing an interference fringe pattern, formed on the recording plane, based on object light components, emitted from the individual unit light sources constituting the respective original images, and the reference light; and a pattern forming step of forming the interference fringe pattern on a physical medium; and wherein in the pattern computation step, a computation is performed upon applying, to a spreading of an object light from each unit light source, a restriction that is in accordance with the original image to which the unit light source belongs.

(17) The seventeenth feature of the invention resides in a method for manufacturing a hologram recording medium that has an arrangement by which different original images are reproduced when observed from different positions, the hologram recording medium manufacturing method comprising:

an original image preparation step of preparing a plurality of original images, each as a set of unit light sources positioned in a three-dimensional coordinate system;

a recording plane setting step of setting a predetermined recording plane in the three-dimensional coordinate system;

a pattern computation step of computing a complex amplitude pattern formed on the recording plane by synthesis of object light components emitted from the individual unit light sources constituting the respective original images; and a pattern forming step of forming the complex amplitude pattern on a physical medium; and wherein in the pattern computation step, a computation is performed upon applying, to a spreading of an object light from each unit light source, a restriction that is in accordance with the original image to which the unit light source belongs.

(18) The eighteenth feature of the invention resides in a hologram recording medium which is manufactured by the manufacturing method according to the first to seventeenth features.

(19) The nineteenth feature of the invention resides in a device for manufacturing a hologram recording medium that has an arrangement by which different original images are reproduced when observed from different positions, the hologram recording medium manufacturing device comprising:

an original image storage unit, storing a plurality N of original images, each as data indicating a set of unit light sources positioned in a three-dimensional coordinate system;

a propagation space storage unit, storing a plurality N of propagation spaces, enabling propagation of light emitted from a reference unit light source, as data based on a position of the reference unit light source;

a recording plane setting unit, setting a predetermined recording plane in the three-dimensional coordinate system;

a reference light setting unit, setting a predetermined reference light in the three-dimensional coordinate system;

a pattern computation unit, computing an interference fringe pattern, formed on the recording plane, based on object light components, emitted from the individual unit light sources constituting the respective original images, and the reference light; and a pattern forming unit, forming the interference fringe pattern on a physical medium; and wherein the pattern computation unit performs a computation upon deeming that an object light from a unit light source belonging to an i-th (i=1, 2, . . . , N) original image propagates only within an i-th (i=1, 2, . . . , N) propagation space, with a position of the unit light source being set as a position of the reference unit light source.

(20) The twentieth feature of the invention resides in a device for manufacturing a hologram recording medium that has an arrangement by which different original images are reproduced when observed from different positions, the hologram recording medium manufacturing device comprising:

an original image storage unit, storing a plurality N of original images, each as data indicating a set of unit light sources positioned in a three-dimensional coordinate system;

a propagation space storage unit, storing a plurality N of propagation spaces, enabling propagation of light emitted from a reference unit light source, as data based on a position of the reference unit light source;

a recording plane setting unit, setting a predetermined recording plane in the three-dimensional coordinate system;

a pattern computation unit, computing a complex amplitude pattern formed on the recording plane by synthesis of object light components emitted from the individual unit light sources constituting the respective original images; and a pattern forming unit, forming the complex amplitude pattern on a physical medium; and wherein the pattern computation unit performs a computation upon deeming that an object light from a unit light source belonging to an i-th (i=1, 2, . . . , N) original image propagates only within an i-th (i=1, 2, . . . , N) propagation space, with a position of the unit light source being set as a position of the reference unit light source.

(21) The twenty-first feature of the invention resides in a program that makes a computer function as the original image storage unit, the propagation space storage unit, the recording plane setting unit, the reference light setting unit, and the pattern computation unit of the hologram recording medium manufacturing device according to the nineteenth feature, or a program that makes a computer function as the original image storage unit, the propagation space storage unit, the recording plane setting unit, and the pattern computation unit of the hologram recording medium manufacturing device according to the twentieth feature.

DESCRIPTION OF THE PREFERRED EMBODIMENTS

The present invention shall now be described based on the illustrated embodiments.

Section 1. Basic Embodiment of the Present Invention

Figure 1:
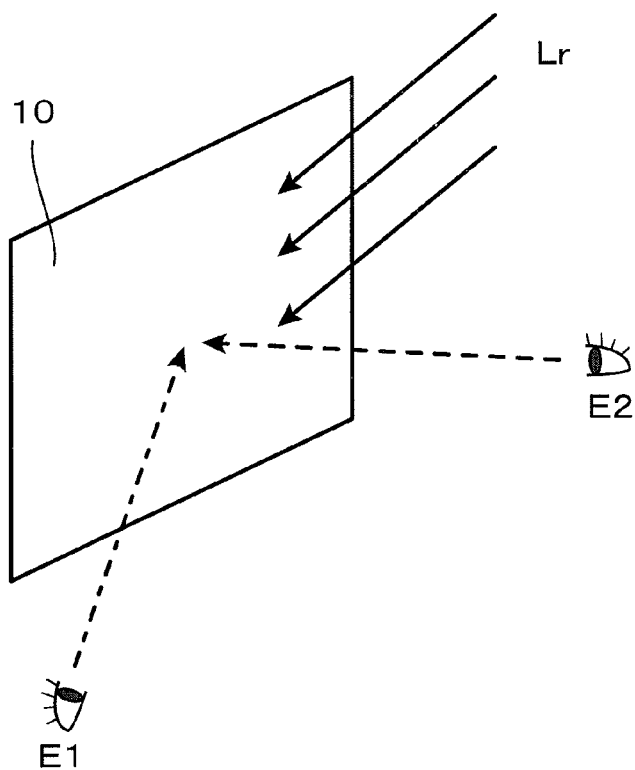
FIG. 1 is a perspective view of modes of observing a hologram recording medium manufactured by a method according to the present invention.

A hologram recording medium manufacturing method according to the present invention shall first be described based on a basic embodiment. FIG. 1 is a perspective view of modes of observing a hologram recording medium 10 manufactured by the method according to the present invention. The hologram recording medium 10 shown here as an example is a reflection type recording medium and as illustrated, a reproduction image is obtained by observation from a front side while a reproduction illumination light Lr is illuminated from the front side. The hologram recording medium has the characteristic that mutually different reproduction images are observed upon observation from a viewpoint E1 and upon observation from a viewpoint E2. As a matter of course, the method according to the present invention is not restricted to the manufacture of a reflection type recording medium, and a transmission type recording medium, with which observation is performed from the front side while the reproduction illumination light Lr is illuminated from the back side, can also be prepared.

Figure 2A:
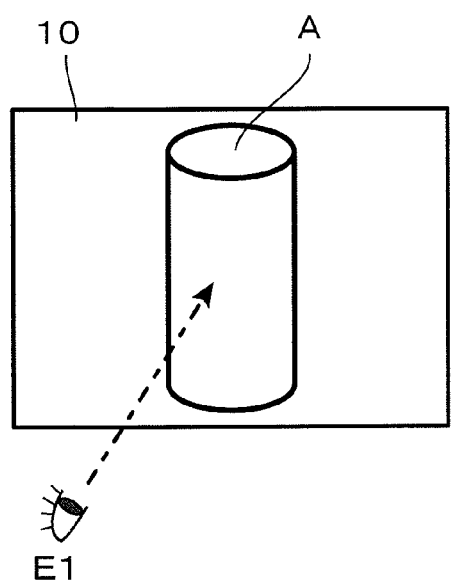
FIGS. 2A and 2B show plan views showing two modes of observing the hologram recording medium shown in FIG. 1.
Figure 2B:
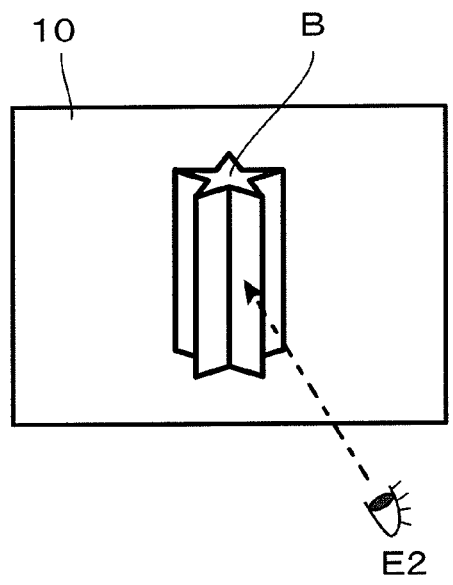

With the specific example shown here, whereas upon observation from the viewpoint E1, a first reproduction image A (an image of a cylindrical column in the present example) is obtained as shown in FIG. 2A, upon observation from the viewpoint E2, a second reproduction image B (an image of a star-shaped column in the present example) is obtained as shown in FIG. 2B. That is, two different original images are overlappingly recorded on the recording medium 10, and mutually different original images are reproduced according to the observation position. As a matter of course, the recording medium 10 can be observed from a position besides the viewpoint E1 and the viewpoint E2 and in such a case, only the first reproduction image A is observed, or only the second reproduction image B is observed, or both reproduction images are observed in a state of being blended at predetermined proportions, in other words, the observation modes vary according to position.

Methods for preparing such a hologram recording medium with the characteristic that different original images are reproduced upon observation from different positions are known as disclosed in the abovementioned Patent Document. However, because as mentioned above, a basic principle of the conventional methods is to set up a plurality of regions on a hologram recording plane and record a different original image on each individual region, there is the problem that the reproduced images are lowered in resolution, and the present invention proposes a new method that resolves this problem.

Figure 3:
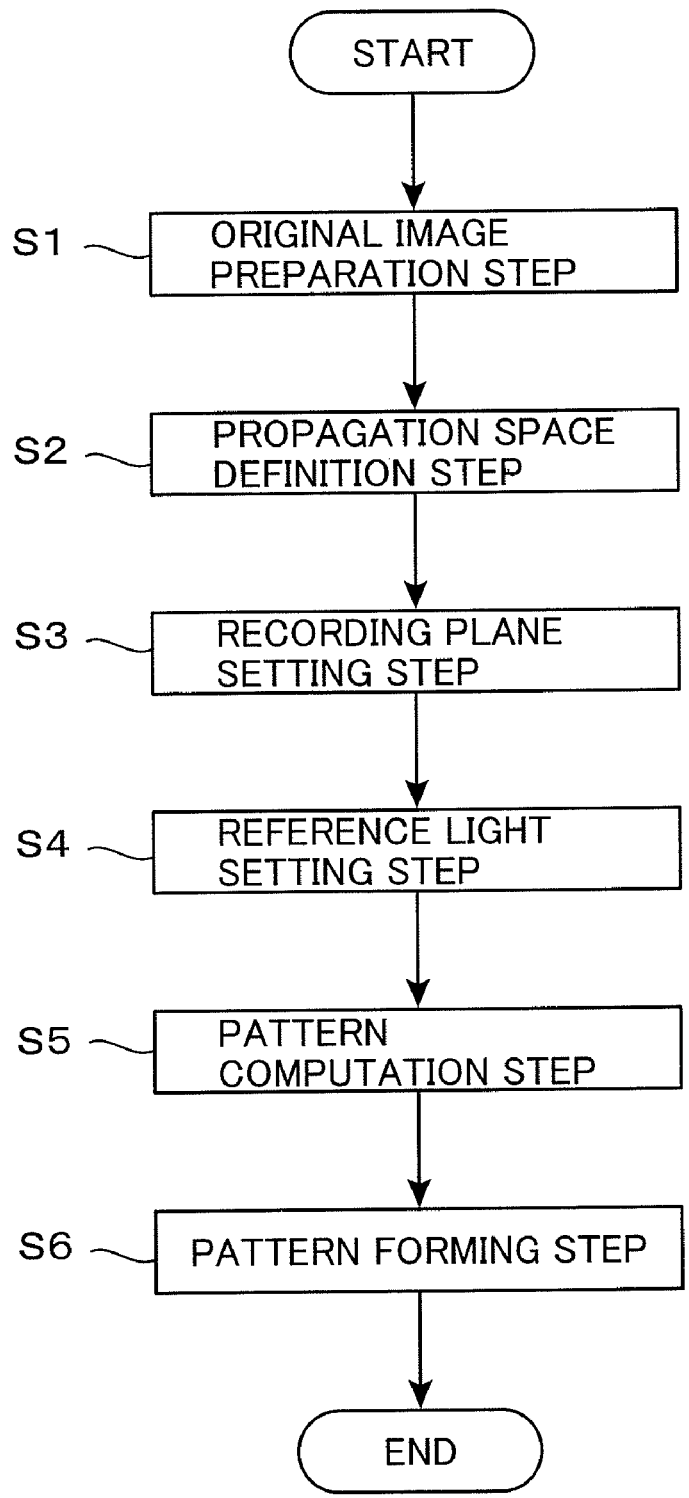
FIG. 3 is a flowchart of a basic procedure of the hologram recording medium manufacturing method according to the present invention.

FIG. 3 is a flowchart of a basic procedure of the hologram recording medium manufacturing method according to the present invention. The basic embodiment of the present invention shall now be described in line with this basic procedure. The flowchart of FIG. 3 illustrates a process for manufacturing a hologram recording medium by a "computer generated hologram (CGH)" method and the procedures of steps S1 to S5 are all procedures that are executed by a computer. A physical hologram recording medium is formed in a final, pattern forming step of step S6.

First, in an original image preparation step of step S1, a plurality N of original images are respectively prepared as a set of unit light sources positioned in a three-dimensional coordinate system. To prepare a recording medium that can reproduce the two reproduction images A and B as in the example of FIG. 2's, two original images are prepared in step S1. Thus although in the description that follows, an example where N=2, that is, an example of a process of preparing two original images and manufacturing the hologram recording medium 10 shown in FIG. 2's shall be described for the sake of convenience, the present invention can obviously be applied to cases of N=3 or more.

Figure 4A:
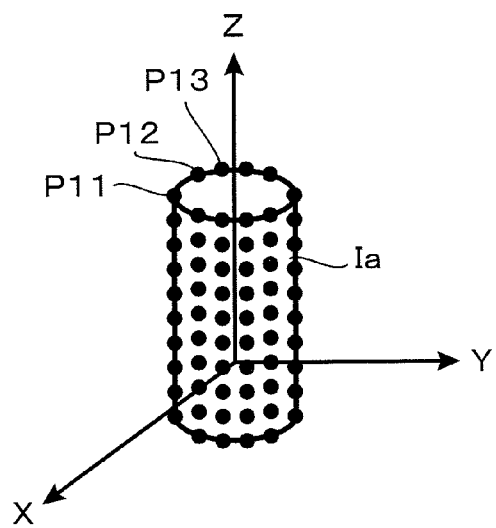
FIGS. 4A and 4B show perspective views of an example of two original images prepared in "S1: Original image preparation step" in the flowchart of FIG. 3.
Figure 4B:
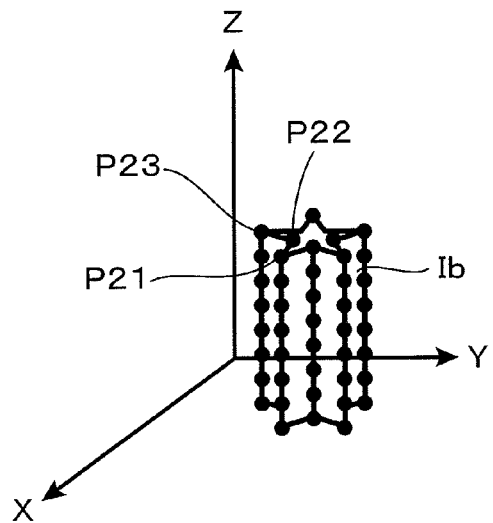

In a general computer generated hologram method, an optical interference fringe generation process is simulated on a computer. Thus here, an XYZ orthogonal coordinate system is defined as a three-dimensional coordinate system in which the optical simulation is performed. FIG. 4's show perspective views of an example of two original images defined in the XYZ coordinate system. FIG. 4A shows a first original image Ia, and FIG. 4B shows a second original image Ib. The first original image Ia of cylindrical columnar shape, shown in FIG. 4A, is the source of the first reproduction image A, shown in FIG. 2A, and the second original image Ib of star-shaped columnar shape, shown in FIG. 4B, is the source of the second reproduction image B, shown in FIG. 2B.

As shown in FIG. 4's, each of the original images Ia and Ib is constituted of a plurality of unit light sources that are positioned in the XYZ coordinate system. Here, it shall be deemed that each unit light source is constituted from a point light sources. The respective point light sources are indicated in FIG. 4's as black dots (such as P11, P12, P13, P21, P22, and P23). Although examples in which the point light sources are positioned sparsely are shown in the figures for the sake of description, in actuality, the point light sources are defined at a higher density in order to prepare original images of higher resolution.

Although in the figures, the first original image Ia is shown in FIG. 4A, the second original image Ib is shown in FIG. 4B, and the two are drawn separately, the two original images Ia and Ib are three-dimensional images defined in the same XYZ coordinate system, and with the present example, the two are positioned so as to overlap partially. As shown in the observation modes of FIG. 2's, because mutually different original images are reproduced from the hologram recording medium 10 according to the viewpoint position of observation, there is no problem whatsoever even if the plurality of the original images prepared in the original image preparation step S1 are positioned so as to partially overlap spatially.

Obviously the respective original images Ia and Ib are images defined on a computer and the actual entities thereof are digital image data. The original image preparation step of step S1 is thus actually a process of preparing original images Ia and Ib, constituted of digital image data, inside a storage unit of a computer. Although in the illustrated example, both of the original images Ia and Ib are images with three-dimensional shapes, the original images prepared in the present invention do not necessarily have to be three-dimensional images and planar images (such as character strings positioned in a two-dimensional plane) may be used as original images as well.

Next, in a propagation space definition step of step S2, a process, in which a plurality N of propagation spaces, which enable propagation of light emitted from a reference unit light source, are defined based on the position of the reference unit light source. Here, the reference unit light source is a light source equivalent to each of the unit light sources that constitute the original images in step S1, and thus in the embodiment described here, the reference unit light source is a "point light source." The "propagation space" defined in step S2 signifies a "space that is more narrowly restricted than a space in which light emitted from the reference light source would normally propagate" and is a space that a preparer of the hologram recording medium sets up arbitrarily.

Figure 5:
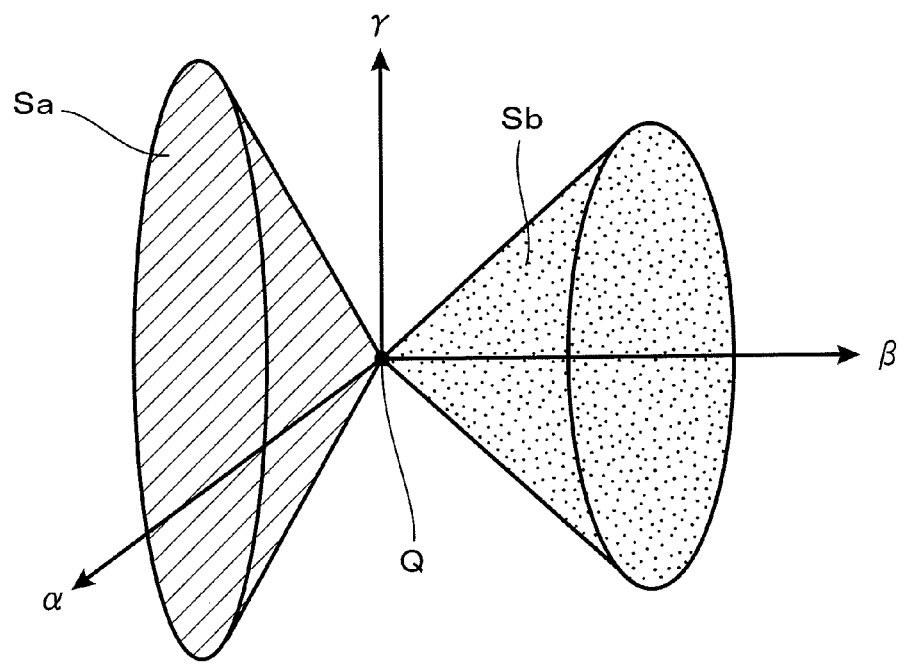
FIG. 5 is a perspective view of an example of two propagation spaces defined in "S2: Propagation space definition step" in the flowchart of FIG. 3.

FIG. 5 is a perspective view of two propagation spaces Sa and Sb that are defined with respect to a reference unit light source Q (point light source). The propagation space Sa is a conical space, indicated by hatching by slanted lines in the figure, and the propagation space Sb is a conical space, indicated by hatching by dots in the figure. Although both propagation spaces have a conical shape with the reference unit light source Q as the apex, whereas the propagation space Sa is a space that broadens in the left direction of the figure, the propagation space Sb is a space that broadens in the right direction of the figure.

In the present embodiment, an origin of an $\alpha\beta\gamma$ orthogonal coordinate system is set at the position of the reference unit light source Q, and the two propagation spaces Sa and Sb are defined in the $\alpha\beta\gamma$ coordinate system. Although for the sake of convenience, the respective propagation spaces Sa and Sb are drawn as cones of finite height in the figure, in actuality the respective propagation spaces Sa and Sb are defined as cones of infinite height. Put in another way, the conical propagation spaces can be defined as solid angles with directionality based on the apex Q and indicate spaces within which light emitted from a point light source positioned at the origin Q spreads.

Conventionally, a point light source is a light source that emits light that spreads as a spherical wave from a certain point, and when a point light source is positioned at the position of the origin Q of the $\alpha\beta\gamma$ coordinate system shown in FIG. 5, the light emitted from the point light source propagates in all directions around the origin Q and spreads across all spaces within the $\alpha\beta\gamma$ coordinate system. Actually from the macroscopic perspective of the Milky Way Galaxy, the Sun can be handled substantially as a point light source and the light emitted from the Sun propagates across the entire galaxy. The "propagation space" defined in step S2 is a space that is set by restricting the normal emission directions of light from such a light source and is a space that is set by artificially defining laws concerning the emission direction of the light apart from the proper laws of physics.

With the example shown in FIG. 5, when the first propagation space Sa is selected, the light from the point light source positioned at the origin Q propagates only within the space provided with the slanted-line hatching and does not propagate in the space besides the selected propagation space. Likewise, when the second propagation space Sb is selected, the light from the point light source positioned at the origin Q propagates only within the space provided with the dot hatching and does not propagate in the space besides the selected propagation space. Such selection of a specific propagation space is equivalent to restricting the light emitted from the origin Q to within a specific solid angle with directionality. In physical terms, this can be considered to be a state in which the space besides the specific propagation space is filled with a non-transparent substance with a light absorbing property.

The basic principles of the embodiment described here are as follows. First, as shown in FIGS. 4A and 4B, the two original images Ia and Ib are respectively defined as sets of point light sources in the XYZ coordinate system (step S1). Then as shown in FIG. 5, the two propagation spaces Sa and Sb, in which light emitted from the origin Q of the $\alpha\beta\gamma$ coordinate system can propagate, are defined (step S2). Then upon deeming that the light from each of the point light sources (such as P11, P12, and P13) belonging to the original image Ia spreads only within the propagation space Sa with the origin Q of the $\alpha\beta\gamma$ coordinate system being overlappingly set at the point light source position and that the light from each of the point light sources (such as P21, P22, and P23) belonging to the original image Ib spreads only within the propagation space Sb with the origin Q of the $\alpha\beta\gamma$ coordinate system being overlappingly set at the point light source position, an optical interference fringe generation process is simulated on the computer (steps S3 to S5 to be described below).

In an interference fringe performed by such a method, the light from the first original image Ia, that is, the light from each of the point light sources P11, P12, P13, etc., shown in FIG. 4A propagates only in the left direction of FIG. 5 as indicated by the propagation space Sa shown in the figure. Meanwhile, the light from second original image Ib, that is, the light from each of the point light sources P21, P22, P23, etc., shown in FIG. 4B propagates only in the right direction of FIG. 5 as indicated by the propagation space Sb shown in the figure. Consequently, on the hologram recording medium 10, only the light directed in the left direction of the figure is recorded for the first original image Ia and only the light directed in the right direction of the figure is recorded for the second original image Ib. As a result, when, as in the observation modes shown in FIG. 2's, the hologram recording medium 10 is observed from the left viewpoint E1, the first reproduction image A is observed, and when the hologram recording medium 10 is observed from the right viewpoint E2, the second reproduction image B is observed. In this case, when the hologram recording medium is observed from a front direction, a synthetic image, having the first reproduction image A (cylindrical column) as the right half and the second reproduction image B (star-shaped column) as the left half, is observed.

The procedures of steps S3 to S6 are processes for actually manufacturing the hologram recording medium 10 based on the above-described basic principles. First, in a recording plane setting step of step S3, a predetermined recording plane 20 is set in the XYZ three-dimensional coordinate system, and in a reference light setting step of step S4 that follows, a predetermined reference light R is set in the XYZ three-dimensional coordinate system. The recording plane 20 is a plane that corresponds to the recording surface of the hologram recording medium 10 that is to be the final product and is normally set up as a flat surface of rectangular shape. Meanwhile, the reference light R is a light that is used to generate interference fringes on the recording plane 20 by interference with object light from an original image and is normally set as a planar wave of predetermined wavelength that is made incident on the recording plane 20 at a predetermined incidence angle. And in a pattern computation step of step S5, computation of an interference fringe pattern that is formed on the recording plane 20, set in step S3, is performed based on the object light emitted from each individual unit light source that constitutes each original image and the reference light R set in step S4 (interference fringe generation simulation computation).

Figure 6:
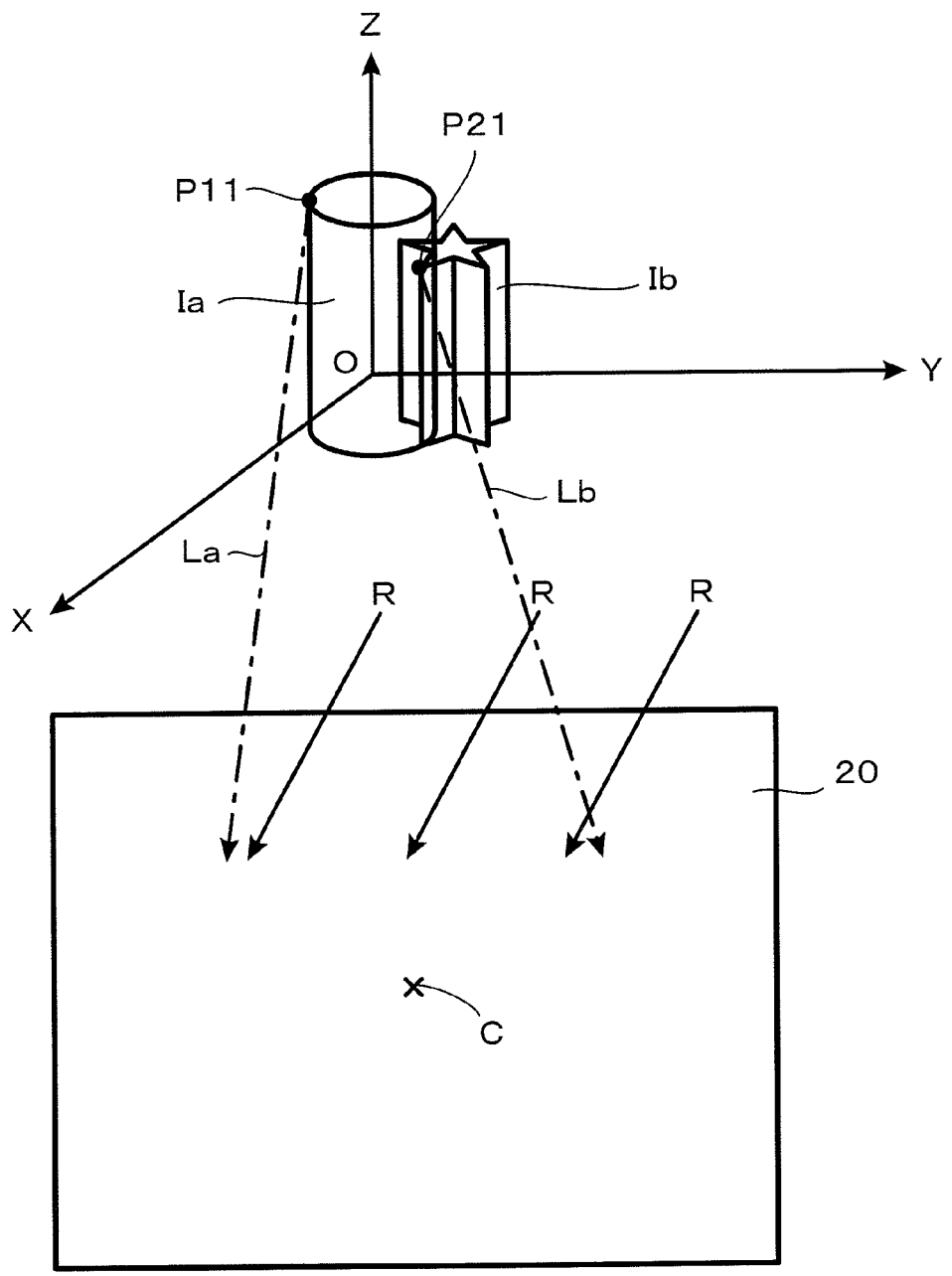
FIG. 6 is a perspective view of concepts of a computation process performed in "S5: Pattern computation step" in the flowchart of FIG. 3.

FIG. 6 is a perspective view of concepts of the computation process performed in the pattern computation step of step S5. In the illustrated XYZ three-dimensional coordinate system, the first original image Ia and the second original image Ib are the original images prepared in step S1 (as mentioned above, these original images are overlapped partially), the recording plane 20 is the plane set in step S3, and the reference light R is the light set in step S4. In the pattern computation step of step S5, the interference fringe pattern, which is formed on the recording plane 20, is determined by computation based on the object light from each individual point light source constituting the first original image Ia (in FIG. 6, just a single light path of an object light La from the point light source P11 is indicated as an example by an alternate long and short dash line), the object light from each individual point light source constituting the second original image Ib (in FIG. 6, just a single light path of an object light Lb from the point light source P21 is indicated as an example by an alternate long and short dash line), and the reference light R.

In actuality, a plurality of computation points that are aligned vertically and horizontally at predetermined pitches are defined on the recording plane 20 and a computation of determining the amplitude intensity of light at the position of each individual computation point is performed. For example, computation concerning the position of an illustrated computation point C is performed as follows. First, the object light from each individual light source constituting the first original image Ia and the object light from each individual light source constituting the second original image Ib that reach the computation point C are synthesized to determine a synthetic object light. The amplitude intensity of an interference wave that is obtained at the computation point C by interference of the synthetic object light with the reference light R is then determined as a density value of the interference fringe pattern at the computation point C. Such a density value is obtained for each of the plurality of computation points defined on the recording plane 20, and the distribution of these density values becomes the interference fringe pattern to be determined in step S5.

This computation process of step S5 can generally be defined as a process of determining a synthetic object light by synthesizing the object light components emitted from the respective individual unit light sources constituting the respective original images and determining the interference fringe pattern formed on the recording plane 20 by the interference of the synthetic object light and the reference light by computation. More specifically, when an object light component emitted from an individual point light source constituting an original image is expressed by a formula using the complex number $A \cdot \exp(-i\omega t + i\phi)$ (where A is the amplitude, $\omega$ is the frequency, t is the time, $\phi$ is the phase, and i is the unit imaginary number), the synthetic object light for the position of a specific computation point C is determined by determining the sum of the above formula for all object light components that reach the position, and the interference wave intensity of this synthetic object light and the reference light R at the position of the computation point C is determined by computation. Because such a computation process in itself is known as a general method for "computer generated holograms," detailed description thereof shall be omitted here.

A characteristic of the present invention is that in this pattern computation step of step S5, restrictions are applied to the propagation of the object light components using the propagation spaces defined in step S2. In general terms, when N original images are prepared in step S1 and N propagation spaces are defined in step S2, computation is performed in the pattern computation step of step S5 upon deeming that an object light from a unit light source belonging to an i-th (i=1, 2, . . . , N) original image propagates only within an i-th (i=1, 2, . . . , N) propagation space with the position of the unit light source being set as the position of the reference unit light source.

With the embodiment described up to now, N=2, the two original images Ia and Ib are prepared in step S1 as shown in FIGS. 4A and 4B, and the two propagation spaces Sa and Sb are defined in step S2 as shown in FIG. 5. The computation process of step S5 is thus performed in a state of applying the following restrictions. That is, the restriction that the object light from a point light source (unit light source) belonging to the first original image Ia propagates only within the first propagation space Sa with the position of the point light source being set as the position of the reference unit light source Q and the restriction that the object light from a point light source (unit light source) belonging to the second original image Ib propagates only within the second propagation space Sb with the position of the point light source being set as the position of the reference unit light source Q are applied.

This shall now be described more specifically. A case of determining the interference fringe pattern density value for a specific computation point C, defined on the recording plane 20 in the example shown in FIG. 6, shall be considered. In this case, conventionally (that is, with the conventional method), the interference fringe intensity is computed on the premise that the object light components from all point light sources constituting the first original image Ia and the object light components from all point light sources constituting the second original image Ib reach the computation point C. This computing method is based on the basic law of physics that "light emitted from a point light source propagates across the entire surrounding space."

Meanwhile, with the present invention, first, for each individual point light source, a task of judging whether or not the light from the point light source reaches the computation point C is performed in reference to the propagation space defined in step S2. For example, whether or not the object light emitted from the point light source P11 shown in FIG. 6 reaches the computation point C can be judged as follows. First, the origin Q (reference unit light source Q) of the αβγ coordinate system (local coordinate system), shown in FIG. 5 is set at the position of the point light source P11, defined in the XYZ coordinate system (global coordinate system) shown in FIG. 6, and the two coordinate systems are overlapped so that the respective corresponding coordinates (for example, the X-axis and α-axis, the Y-axis and the β-axis, and the Z-axis and the γ-axis) are parallel to each other. It is then judged whether or not the object light from the point light source P11 reaches the computation point C under the premise that the object light spreads only within the first propagation space Sa of conical shape. Put in another way, if when the two coordinate systems are overlapped as described above, the computation point C is contained within the propagation space Sa, it can be deemed that the light emitted from the point light source P11 reaches the computation point C.

The same judgment process is then performed for each of all of the point light sources constituting the first original image Ia. For example, in making the judgment in regard to the point light source P12 in FIG. 4A, whether or not the computation point C is contained within the first propagation space Sa when the origin Q of the αβγ coordinate system is overlappingly set at the position of the point light source P12 is judged, and in making the judgment in regard to the point light source P13, whether or not the computation point C is contained within the propagation space Sa when the origin Q of the αβγ coordinate system is overlappingly set at the position of the point light source P13 is judged. Meanwhile, in making the judgment in regard to the point light source P21 in FIG. 4B, whether or not the computation point C is contained within the second propagation space Sb when the origin Q of the αβγ coordinate system is overlappingly set at the position of the point light source P21 is judged. Likewise, in making the judgments in regard to each of the point light sources P22 and P23 in FIG. 4B, whether or not the computation point C is contained within the second propagation space Sb when the origin Q of the αβγ coordinate system is overlappingly set at the position of the point light source is judged.

By thus taking the respective propagation spaces into consideration, the judgment of whether or not light emitted from a specific light source arrives can be made for a specific computation point C. In computing the interference fringe intensity at the position of the specific computation point C, just the light components from point light sources for which it has been judged that light reaches the position of the computation point C are handled as the object light components, and point light sources besides these are ignored. By computing the interference fringe intensity values for individual computation points C by such a computation, a distribution of the interference fringe intensity values on the recording plane 20 is obtained in the form of an interference fringe pattern.

The pattern forming step of step S6 in the flowchart shown in FIG. 3 is a step of forming the interference fringe pattern, determined in step S5, on a physical medium. In this step, any method may be employed as long as the density pattern of interference fringes can be formed in some way on a physical medium. Because various methods are already known as such a method, a detailed description shall be omitted here, and generally, a method of converting the interference fringe pattern, obtained in the pattern computation step of step S5, into a binary image pattern and forming the binary image pattern on a physical medium is employed widely. For example, a planar medium, constituted of the two colors of black and white, a three-dimensional structure medium, constituted of the two types of portions of recessed portions and protruding portions, etc., are generally used. Because the interference fringe pattern is an extremely fine pattern that gives rise to optical interference, in terms of practical use, a method, in which the fine pattern that is to be formed is provided to an electron beam printer and physical interference fringes are formed by scanning an electron beam across a medium is employed in many cases.

Section 2. Other Embodiments Related to Propagation Spaces

A basic embodiment of the present invention was described above in Section 1. In summary, the basic philosophy of the present invention is to perform, in the pattern computation step, a computation with a restriction, which is in accordance with an original image, being applied to the spreading of object light from each unit light source belonging to the original image. With the example shown in FIG. 5, for object light from a unit light source belonging to the first original image, the interference fringe pattern computation is performed upon restricting the spreading of the object light to within the propagation region Sa, and for object light from a unit light source belonging to the second original image, the interference fringe pattern computation is performed upon restricting the spreading of the object light to within the propagation region Sb. The propagation space as defined in the present invention is thus a space with a function of restricting the spreading of object light from a point light source, and as long as this function is served, any space may be defined as a propagation space. Here, other embodiments related to the definition of the propagation space shall be described.

(1) Shape and Position of the Propagation Space

Although FIG. 5 shows an example in which conical propagation spaces Sa and Sb are defined, the shape of the propagation space defined in step S2 is not necessarily restricted to a conical shape and propagation spaces of arbitrary shapes can be set according to the intentions of a preparer. Because with a "computer generated hologram" method, the interference fringes formed on a hologram recording plane are strictly determined by an optical phenomenon simulation computation performed on a computer, some form of interference fringes can be determined no matter what form of propagation space is defined. However, because in the case of a point light source, light from the light source position should normally spread radially, when a point light source is used as the unit light source constituting an original image, a propagation space of a subulate shape (cone or pyramid) having the position of the point light source as an apex is preferably defined.

Also, although in FIG. 5, the first propagation space Sa is defined as a conical space that is directed toward the left and the second propagation space Sb is defined as a conical space that is directed toward the right, the position (direction) of each individual propagation space may be set arbitrarily according to the intentions of the preparer. However, because as mentioned above, the position (direction) of each individual propagation space is a factor related to the observation direction of the reproduction image, the position (direction) of each individual propagation space must be set in consideration of the observation modes of the hologram recording medium that is manufactured in the final stage. For example, in a case where the first propagation space Sa is defined as an upward-directed conical space and the second propagation space Sb is defined as a downward-directed conical space, the hologram recording medium that is manufactured in the final stage has observation modes such that the first reproduction image A is reproduced upon observation from above and the second reproduction image B is reproduced upon observation from below.

Figure 7:
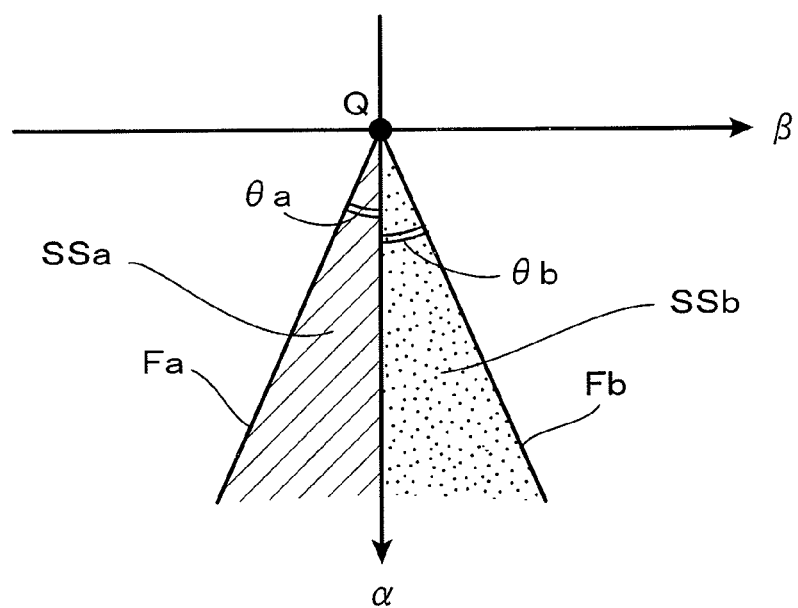
FIG. 7 is an upper view of another example of two propagation spaces defined in "S2: Propagation space definition step" in the flowchart of FIG. 3.

FIG. 7 is an upper view of an example of a more practical embodiment of defining two propagation spaces. With this diagram, the αβγ coordinate system is viewed downward in the direction of the γ-axis, with the γ-axis being an axis that is perpendicular to the paper surface at the position of the origin Q. As illustrated, two propagation spaces SSa (indicated as the slanted-line hatching portion) and SSb (indicated as the dot hatching portion) are defined here. These propagation spaces SSa and SSb indicate restrictions concerning the αβ two-dimensional plane that are applied to light from a reference unit light source (point light source) positioned at the origin Q. As illustrated, the propagation space SSa is a wedge-type space, sandwiched by the αγ plane (plane perpendicular to the paper surface) and a boundary plane Fa (plane perpendicular to the paper surface) forming an angle θ a with the αγ plane, and the propagation space SSb is a wedge-type space, sandwiched by the αγ plane (plane perpendicular to the paper surface) and a boundary plane Fb (plane perpendicular to the paper surface) forming an angle θ b with the αγ plane.

In the case where the reference unit light source Q is a point light source, because the light emitted from the point light source spreads radially, even if the wedge-type propagation spaces SSa and SSb are defined, this is practically equivalent to defining pyramidal propagation spaces. Put in another way, because in the pattern computation step of step S5, only object light components that reach the predetermined recording plane 20 of finite area need to be considered, light components that do not reach the recording plane 20 are beyond consideration in the computation to start with. For example, although when the propagation space SSa is defined as the wedge-type space sandwiched by the αγ plane and the boundary plane Fa, the γ-axis itself is contained within this space, if the reference unit light source Q is a point light source, light propagating in the γ-axis direction does not reach the recording plane 20 in the setting shown in FIG. 6.

Thus a "propagation space" as referred to in the present invention does not necessarily signify "a space with which any object light that propagates within the space must be taken into consideration in the pattern computation step of step S5" but should be deemed to be "a space with which an object light that propagates outside the space is not taken into consideration in the pattern computation step of step S5" and, in the computation process, is a space that is defined for restricting the propagation of light from the light source. Thus, in the pattern computation step of step S5, an object light that propagates in a space outside the propagation region is ignored, and an object light, which, though being an object light that propagates within the propagation region, does not reach the recording plane, does not contribute whatsoever to the computation. From the standpoint of the computation process, even if the wedge-type propagation spaces SSa and SSb are defined, this is equivalent to defining pyramidal propagation spaces, and for practical purposes either the wedge-type propagation spaces or the pyramidal propagation spaces may be used.

Figure 8:
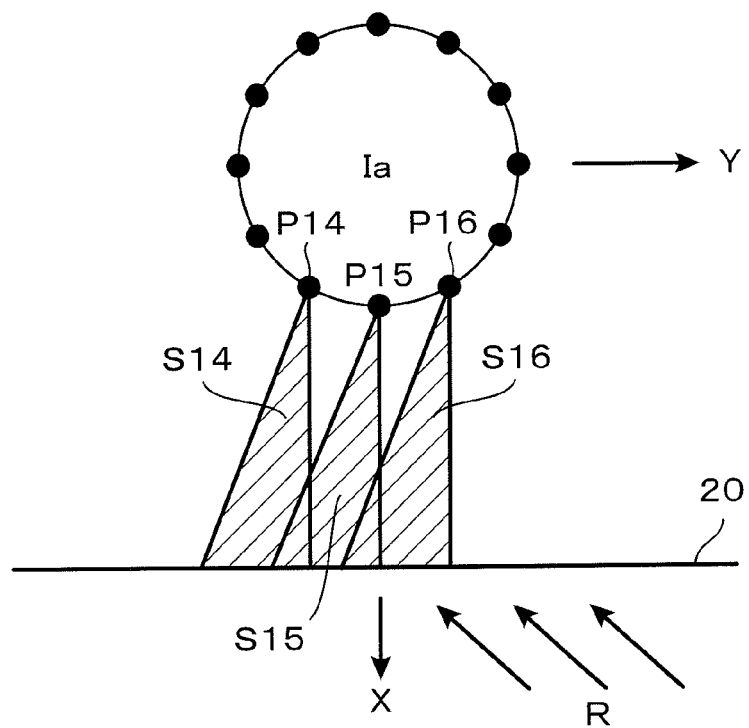
FIG. 8 is an upper view of a manner in which light components, emitted from respective point light sources constituting an original image Ia, spread according to a propagation space SSa, shown in FIG. 7.
Figure 9:
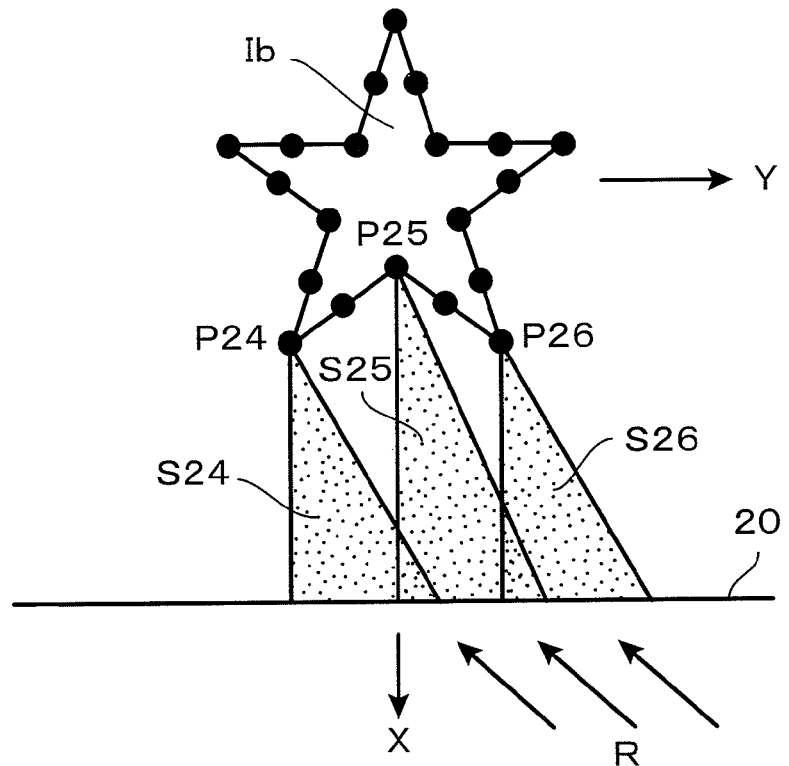
FIG. 9 is an upper view of a manner in which light components, emitted from respective point light sources constituting an original image Ib, spread according to a propagation space SSb, shown in FIG. 7.

FIG. 8 is an upper view of a manner in which light components, emitted from respective point light sources constituting the original image Ia, spread according to the propagation space SSa, shown in FIG. 7, and FIG. 9 is an upper view of a manner in which light components, emitted from respective point light sources constituting the original image Ib, spread according to the propagation space SSb, shown in FIG. 7. In both of these upper views, the XYZ coordinate system is viewed downward in the Z-axis direction and the Z-axis is an axis perpendicular to the paper surface. As shown in FIG. 8, in computing the interference fringes formed on the recording plane 20, the light components, for example, from the point light sources P14, P15, and P16 that constitute the first original image Ia are deemed to respectively propagate only within the propagation spaces S14, S15, and S16 (propagation spaces in the XYZ global coordinate system) that are provided with the slanted-line hatching in the figure.

Here, for example, the propagation space S14 corresponds to the propagation space SSa (propagation space in the local coordinate system) with the origin Q of the αβγ local coordinate system shown in FIG. 7 being overlappingly set at the position of the point light source P14, and the object light emitted from the point light source P14 is deemed to propagate as a spherical wave only within the propagation space S14. Put in another way, the computation that takes the object light emitted from the point light source P14 into consideration is executed only on computation points within a region of the recording plane 20 that overlaps with the propagation space S14.

Meanwhile, as shown in FIG. 9, the light components from the point light sources P24, P25, and P26 that constitute the second original image Ib are deemed to respectively propagate only within the propagation spaces S24, S25, and S26 that are provided with the dot hatching in the figure. Here, for example, the propagation space S24 corresponds to the propagation space SSb with the origin Q of the αβγ local coordinate system shown in FIG. 7 being overlappingly set at the position of the point light source P24, and the object light emitted from the point light source P24 is deemed to propagate as a spherical wave only within the propagation space S24.

(2) Interrelationship Among the Plurality of Propagation Spaces

The two propagation spaces Sa and Sb shown in FIG. 5 are regions that are spatially exclusive with respect to each other and there is no spatial overlapping between the two. Likewise, the two propagation spaces SSa and SSb, shown in FIG. 7, though contacting mutually with the αγ plane as a boundary plane, are spatially exclusive regions and there is no spatial overlapping between the two. A basic function of the hologram recording medium according to the present invention is the function that different original images are reproduced when observed from different positions, and in realizing such a function, it is preferable, in the process of defining the plurality N of propagation spaces in the propagation space definition step, to define the spaces to be spatially exclusive regions with respect to each other.

However, in defining the plurality N of propagation spaces, definitions, which define the regions as being spatially exclusive with respect to each other, do not necessarily have to be used. In actuality, a portion or all of the plurality N of propagation spaces may be defined as regions that partially overlap spatially with another propagation space. With a hologram recording medium that is prepared using such definitions of partially overlapping regions, a phenomenon, in which a plurality of original images are observed simultaneously upon observation from a specific position, can occur.

For example, when with the example shown in FIG. 5, a right side portion of the first propagation space Sa and a left side portion of the second propagation space Sb are overlapped spatially, a point, at which both the reproduction images A and B are observed overlappingly, becomes present at a position intermediate the viewpoint E1 shown in FIG. 2A and the viewpoint E2 shown in FIG. 2B. Thus, as the viewpoint is moved gradually from the left side to the right side, the observed reproduction image changes gradually from the first reproduction image A to the second reproduction image B. To realize such an observation mode, definitions are constructed so that the two propagation spaces overlap partially.

However, in terms of practical use, even if mutually exclusive propagation spaces are defined, exclusive observation modes will not necessarily be realized. For example, in Section 1, it was described that when the exclusive propagation spaces Sa and Sb are defined as shown in FIG. 5, the first reproduction image A is observed upon observation from the viewpoint E1 and the second reproduction image B is observed upon observation from the viewpoint E2 as shown in FIG. 2's. However, such observation modes are obtained only under the premise of an ideal illumination environment in which reproduction illumination light of the same wavelength (monochromatic light) as the reference light used during recording is illuminated from the same direction as the reference light. Observation under such an ideal illumination environment is rare in actuality, and in the case of observation using both eyes, because the viewpoint is not a single point, even if exclusive propagation spaces are defined, the phenomenon of simultaneous observation of a plurality of original images can occur. As a matter of course, as the observation position is changed, the brightness of the respective reproduction images change and an image may become chipped partially.

(3) Defining the Same Propagation Space

According to the basic principles of the present invention, after preparing a plurality N of original images in the original image preparation step (step S1), the same plurality N of propagation spaces are defined in the propagation space definition step (step S2), and in the pattern computation step (step S5), computation is performed upon deeming that an object light from a unit light source belonging to an i-th (i=1, 2, ..., N) original image propagates only within the i-th (i=1, 2, ..., N) propagation space with the position of the unit light source being set as the position of the reference unit light source. For example, in the case of N=3, three original images and three propagation spaces are prepared, and it is deemed that an object light from the first original image propagates only within the first propagation space, an object light from the second original image propagates only within the second propagation space, and an object light from the third original image propagates only within the third propagation space.

Here, although that a portion or all of the N propagation spaces may be defined as regions that partially overlap spatially with another propagation space has been described in (2) above, a portion or all of the N propagation spaces may also be defined as regions that spatially matches another propagation space completely. For example, when three original images and three propagation spaces are prepared as mentioned above, the space Sa shown in FIG. 5 may be defined as the first propagation space and the second propagation space, and the space Sb may be defined as the third propagation space. In this case, the first propagation space and the second propagation space are defined as regions that are completely the same (obviously, a portion of the propagation space Sa and a portion of the propagation space Sb may be overlapped partially).

By constructing such definitions, a hologram recording medium can be prepared with which the first reproduction image and the second reproduction image can be observed upon observation from the first viewpoint E1 and the third reproduction image can be observed upon observation from the second viewpoint E2. With such a hologram recording medium, because the first propagation space and the second propagation space are set to the same space, the first original image and the second original image are recorded under the same conditions and the observation modes of the first reproduction image and the second reproduction image are the same. That is, if upon observation from a certain viewpoint, the first reproduction image can be observed, the second reproduction image can also be observed at the same time. However, because the third propagation space is set as a separate space, the third original image is recorded under separate conditions and the observation mode of the third reproduction image is different.

That "different original images are reproduced upon observation from different positions" in the present invention does not mean that "for a plurality N of original images, just one of the original images can be observed upon observation from a certain specific position" but means that "the combination of observable original images, among a plurality N of original images, changes when the observation position is changed."

Section 3. Embodiment of Applying Restrictions by Plate-Like Spaces

Methods, of performing computation upon applying some form of restriction on the spreading of an object light from a unit light source constituting an original image in preparing a computer generated hologram, are in themselves known. For example, Japanese Patent Laid-open Publications No. H11-24539A and No. H11-202741A disclose methods of computing interference fringe intensities upon restricting the spreading of an object light from a point light source within a space defined by a predetermined angle of spread. The purpose of "restricting the spread angle of the object light" in the method disclosed in these publications is to suppress luminance non-uniformity or to lighten the computational load and is not to enable reproduction of different original images upon observation from different positions as in the present invention. As a matter of course, the important characteristic of the present invention of defining a propagation space (defining an object light spread angle) according to each individual original image is not disclosed whatsoever in these publications.

Although the actions and effects of the "restriction of the spread angle of object light" in the present invention and the actions and effects of the "restriction of the spread angle of object light" in the abovementioned known examples thus differ completely in principle, because these share the point that the spread angle of object light is restricted in some form in computing the interference fringe intensities, the two can be used in combination. Put in another way, in putting the present invention into practice, the "restriction of the spread angle of object light" of the abovementioned known example can be applied overlappingly. An example of such an embodiment shall now be described.

Figure 10:
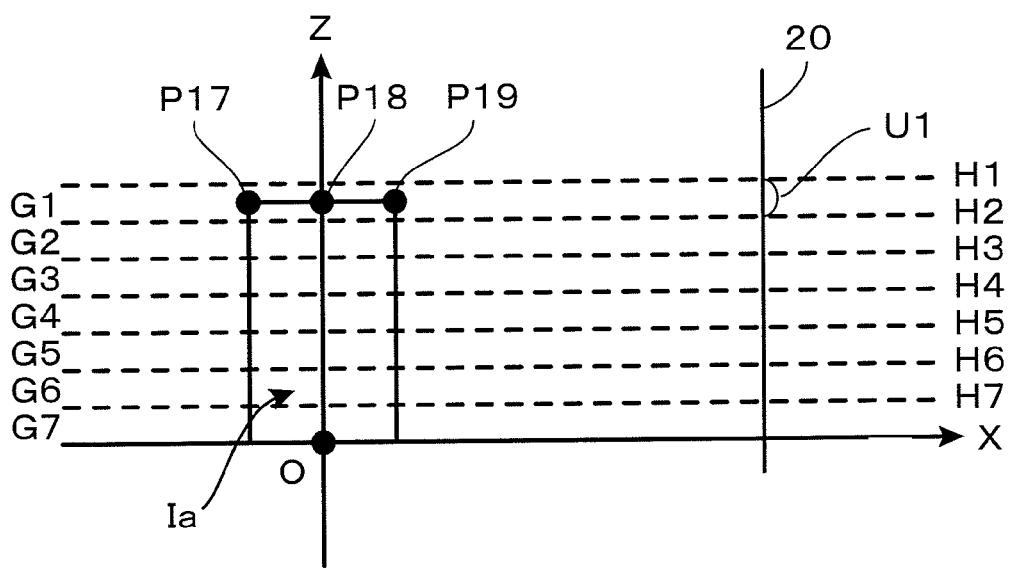
FIG. 10 is a sectional view of concepts of performing interference fringe pattern computation upon partitioning a three-dimensional space into a plurality of plate-like spaces and restricting the spread of light, emitted from each point light source, to only within a single plate-like space.

FIG. 10 is a sectional view (view sectioned along the XZ plane) of concepts of performing interference fringe pattern computation upon partitioning a three-dimensional space, defined by the XYZ global coordinate system, into a plurality of plate-like spaces and restricting the spread of light, emitted from each point light source, to only within a single plate-like space. With the illustrated example, the three-dimensional space is partitioned into a plurality of plate-like spaces G1 to G7 by seven slicing planes H1 to H7, indicated by broken lines. Here, each of the slicing planes H1 to H7 is a plane parallel to the XY plane. For example, the plate-like space G1 is a space sandwiched between the slicing planes H1 and H2, the plate-like space G2 is a space sandwiched between the slicing planes H2 and H3, and the plate-like space G7 is a space sandwiched between the slicing plane H7 and the XY plane.

In the figure, Ia is a first original image of cylindrical columnar shape, and P17, P18, and P19 are examples of point light sources that constitute the first original image Ia. A plane 20 at the right side of the figure is a recording plane defined in the XYZ coordinate system, and an interference fringe intensity is computed for each of a plurality of computation points positioned on the recording plane 20 (the illustration of the reference light R is omitted).

As mentioned above, with the present invention, an object light emitted from a point light source constituting the first original image Ia is deemed to propagate only within a predetermined propagation space based on the point light source. With the embodiment described here, as a further weighting condition, it is deemed that an object light emitted from a specific point light source propagates only within a plate-like space to which the point light source belongs. For example, because the illustrated point light sources P17, P18, and P19 are point light sources positioned inside the first plate-like space G1, the object light components from the point light sources P17, P18, and P19 are deemed to propagate only within a predetermined propagation space (the propagation space defined in correspondence to the first original image Ia) and within the first plate-like space G1.

Here, if, of the recording plane 20, the region sandwiched between the slicing planes H1 and H2 is referred to as a unit recording region U1 as shown in the figure, then among the object light components from the point light sources P17, P18, and P19 positioned in the plate-like space G1, the object light components that are to be taken into consideration in the computation of the interference fringe pattern formed on the recording plane 20 are restricted to only the light components that propagate "within the predetermined propagation space defined in advance" and "within the plate-like space G1." That is, although conventionally, the object light components from the point light sources P17, P18, and P19 propagate across the entire space inside the XYZ coordinate system, in the embodiment described here, of the object light components that propagate across the entire space, the object light components that propagate outside the plate-like space G1 are not taken into consideration whatsoever in the computation of the interference fringe pattern.

Put in another way, the object light components from the point light sources P17, P18, and P19 are used only in the interference fringe intensity computation for a computation point positioned inside the illustrated unit recording region U1 (a strip-like region that extends in the direction perpendicular to the paper surface) and are not involved whatsoever in computations concerning computation points positioned at other positions. Obviously, the object light from each of the point light sources P17, P18, and P19 is not necessarily used in the interference fringe intensity computations for all computation points inside the unit recording region U1 and is used only in the interference fringe intensity computations of computation points, each of which is "a computation point that is within the unit recording region U1" and is "a computation point inside the predetermined propagation space based on the point light source."

Thus, in general, the characteristic of the embodiment described here is that in the pattern computation step, a three-dimensional space is partitioned into a plurality M of plate-like spaces by slicing by a plurality of mutually parallel planes and computation is performed upon deeming that an object light from a unit light source, inside a j-th (j=1, 2, . . . , M) plate-like space and belonging to an i-th (i=1, 2, . . . , N) original image, propagates only within an i-th (i=1, 2, . . . , N) propagation space and within the j-th (j=1, 2, . . . , M) plate-like space.

By thus applying the object light spread angle restriction that is a characteristic of the present invention and the object light spread angle restriction based on a conventionally known method in an AND condition to perform the interference fringe intensity computation, a synergistic effect of the actions and effects unique to the present invention (the making of different original images be reproduced upon observation from different positions) and the actions and effects unique to the conventionally known method (suppression of luminance non-uniformity and lightening of the computation load) can be obtained.

Section 4. Embodiment Using Segment Light Sources

Figure 11A:
FIGS. 11A and 11B show diagrams of concepts of preparing a segment light source PP based on a point light source P.
Figure 11B:
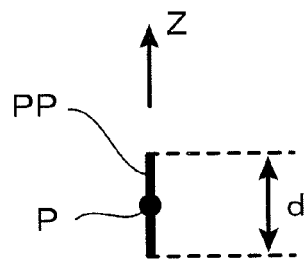

With the embodiments described up to now, examples using point light sources as the unit light sources that constitute an original image have been described. However, in putting the present invention into practice, the individual unit light sources that constitute an original image do not necessarily have to be point light sources. For example, by defining a segment light source as a locus of moving a point light source P, shown in FIG. 11A, by just d/2 in each of the upward and downward directions along the Z-axis, a segment light source PP with a length d can be defined as shown in FIG. 11B. Each of the original images prepared in step S1 of the present invention may be constituted of a collection of such segment light sources PP.

For example, although the original image Ia shown in FIG. 4A and the original image Ib shown in FIG. 4B are both constituted of collections of point light sources, by defining segment light sources as the loci of moving the respective individual point light sources upward and downward along the Z-axis by just d/2, the respective original images Ia and Ib can be handled as collections of segment light sources of length d.

In general, a point light source is a light source that emits object light that is constituted of a spherical wave and an object light from a point light source spreads radially with the position of the point light source as the center. Thus, for a point light source, a typical example of a propagation space that is defined by restricting the spread angle is a conical propagation space Sc shown in FIG. 12 (example of a propagation space when a point light source is positioned at the origin Q). Meanwhile, because light from a segment light source is not a spherical wave, a segment light source must be handled in a slightly different manner from a point light source.

Figure 12:
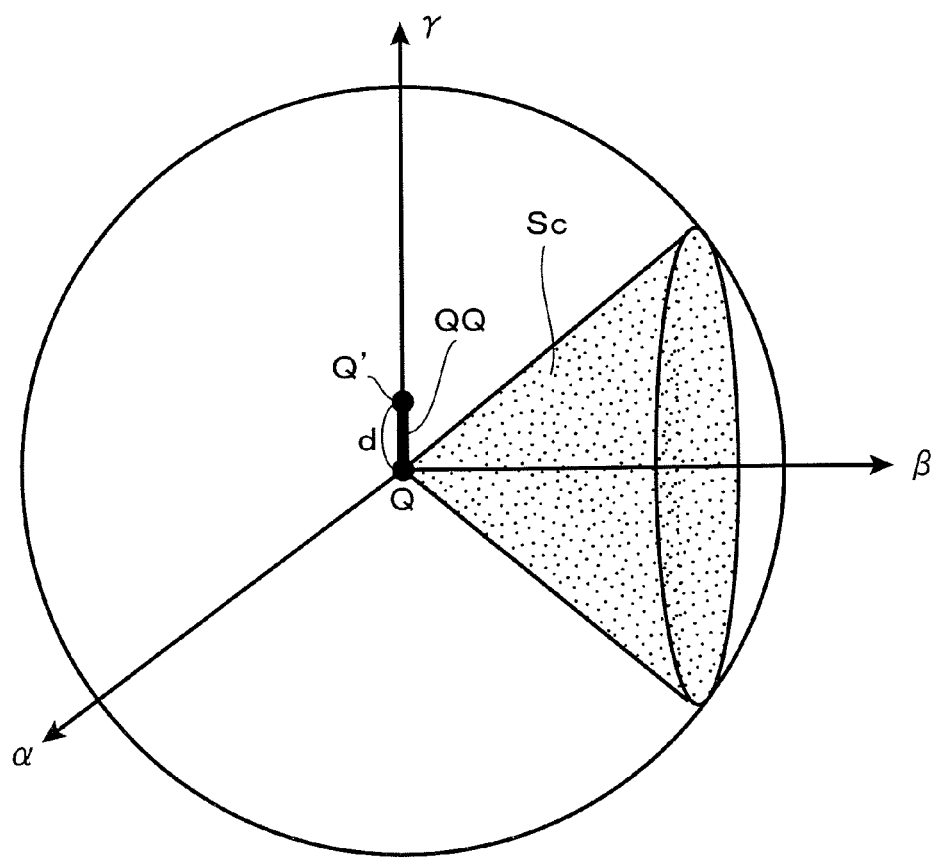
FIG. 12 is a perspective view of an example of a propagation space defined for a point light source Q.

One method of handling a segment light source is to handle it as a light source that is formed by aligning a plurality of point light sources along a segment of predetermined length, that is, as a light source constituted of a set of point light sources. A segment light source QQ, constituted of a segment with a length d (a segment joining the origin Q and a displacement point Q'), shall now be considered with the displacement point Q' being defined at a position along the γ-axis that is separated from the origin Q by just the distance d as shown in FIG. 12. If this segment light source QQ is handled as a collection of point light sources, the wavefront of an object light emitted therefrom is a surface of a collection of spheres, each formed when the illustrated sphere, centered at the origin Q, is moved upward along the γ-axis by just the distance d.

Thus, for such a segment light source QQ, a typical example of a propagation space that is defined by restricting the spread angle can be defined as a space that is occupied when a conical propagation space Sc, shown in FIG. 12, is moved upward along the γ-axis by just the distance d. Put in another way, when the segment light source QQ, constituted by aligning a plurality of point light sources along the segment of predetermined length, is used as the unit light source, a propagation space that is a geometric logical sum of individual subulate shapes, each having the position of an individual point light source, constituting the segment light source QQ, as an apex, is defined in the propagation space definition step.

Another method of handling a segment light source is a method that is in accordance with a line light source. The wavefront of object light emitted from a theoretical line light source (a line light source of infinite length) is a side surface of a cylindrical column having the position of the line light source as central axis. For example, in the case of a line light source extending along the γ-axis, the wavefront is a side surface of a cylindrical column having the γ-axis as the central axis, all object light components propagate in directions orthogonal to the γ-axis, and there are no object light components that propagate in a direction along the γ-axis. Although a segment light source is actually a light source of finite length, it can be handled in a manner that is in accordance with a line light source. In this case, the wavefront of an object light emitted from the segment light source is a side surface of a cylindrical column having the position of the segment light source as the central axis and there are no object light components that propagate in a direction along the segment light source.

Figure 13:
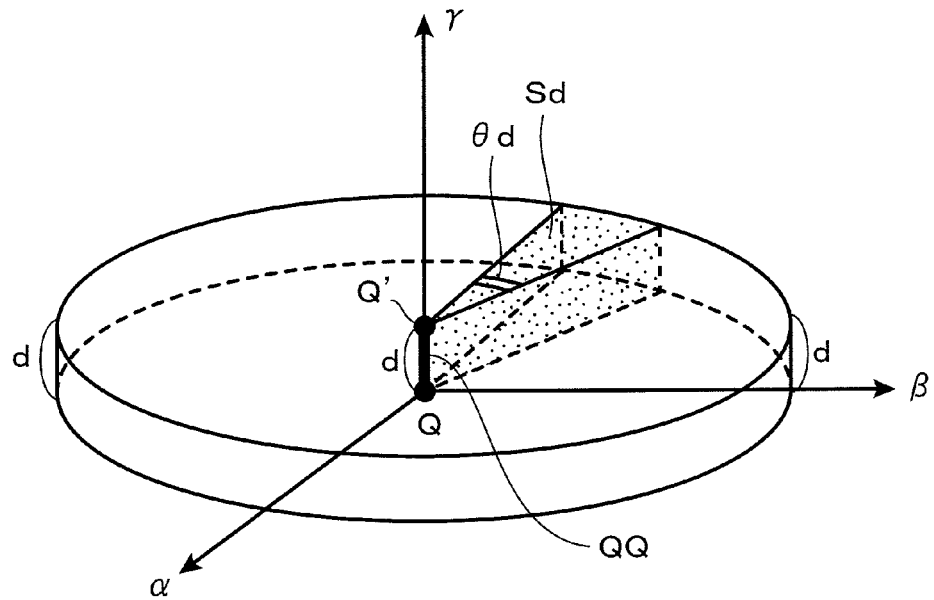
FIG. 13 is a perspective view of an example of a propagation space defined for a segment light source QQ.

For example, when the segment light source QQ, shown in FIG. 13, is handled in a manner that is in accordance with a line light source, an object light emitted from an arbitrary position on the segment light source QQ is light that spreads radially from the γ-axis as the center and along a plane that passes through the arbitrary position and is parallel to the αβ plane. To describe with a specific example, an object light emitted from the displacement point Q' in the figure is light that propagates radially along a plane, expressed by the formula: γ=d, so as to move away from the displacement point Q', and the directions of propagation of all object light components are orthogonal to the γ-axis. An example of such handling of a segment light source is disclosed in Japanese Patent Laid-open Publication No. 2001-013858A.

To handle the segment light source QQ in such a manner that is in accordance with a line light source, a space Sd (having a shape of a serving partitioned from a disk-like pizza pie with a thickness d), which is indicated by dot hatching in FIG. 13, can be defined as a propagation space. Such a propagation space Sd can be defined by the height d, a partitioning angle θd, and its position (direction) (the radius of the pizza pie can be set to infinity). Whereas conventionally in handling the segment light source QQ in a manner that is in accordance with a line light source, the object light emitted from the segment light source QQ propagates across the entire space inside the disk-like pizza pie shown in FIG. 13, by defining the propagation space Sd, indicated by the dot hatching, the range of spread of the object light can be restricted to within a specific range.

When the segment light source QQ is handled in such a manner that is in accordance with a line light source, results close to those of the "embodiment of applying restrictions by plate-like spaces," which was described in Section 3, are obtained. Although an example in which the three-dimensional space, formed by the XYZ coordinate system, is partitioned by slicing planes H1 to H7 to form the plurality of plate-like spaces G1 to G7 is shown in FIG. 10, a case where the interval of each of the slicing planes H1 to H7 is set to d and the individual point light sources are replaced by segment light sources of length d that respectively fit inside the corresponding plate-like spaces shall be considered here.

Figure 14:
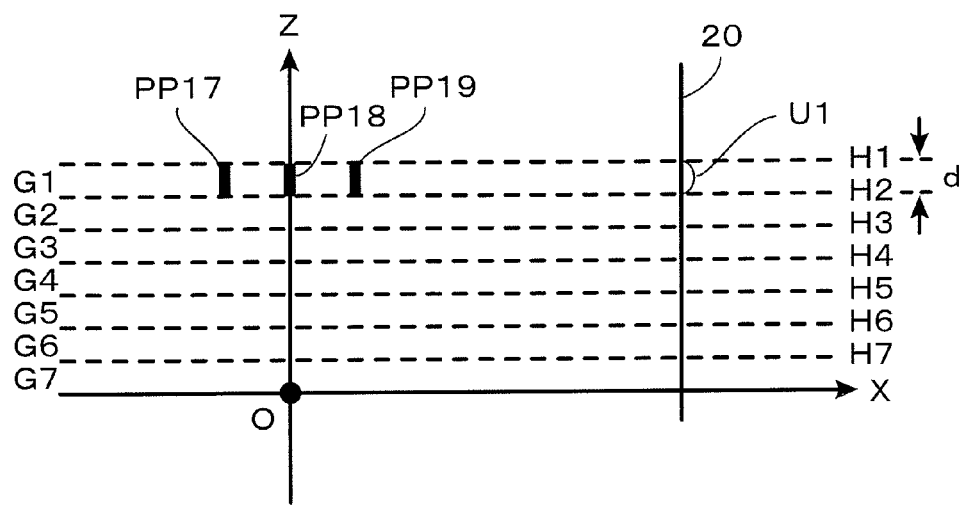
FIG. 14 is a side view of concepts of performing interference fringe pattern computation for an original image constituted of segment light sources.

For example, FIG. 14 shows an example where the point light sources P17, P18, and P19, shown in FIG. 10, are respectively replaced by segment light sources PP17, PP18, and PP19. Each of the segment light sources PP17, PP18, and PP19 has a length d and fits exactly inside the plate-like space G1. Because when each segment light source is handled in a manner that is in accordance with a line light source, the object light propagates only in horizontal directions (directions parallel to the XY plane) in FIG. 14, the object light components from the segment light sources PP17, PP18, and PP19 reach only points within the unit recording region U1. Obviously, the object light components from the segment light sources PP17, PP18, and PP19 do not necessarily reach all computation points inside the unit recording region U1. For example, in the case where the propagation space Sd is defined as shown in FIG. 13, computation of the interference fringe intensities on the recording plane 20 is performed upon deeming that the object light from the segment light source PP17 propagates only within the propagation space Sd with the segment light source QQ (the reference unit light source in the αβγ local coordinate system), shown in FIG. 13, being overlappingly set on the segment light source PP17 (a single unit light source constituting an original image in the XYZ global coordinate system), shown in FIG. 14.

Although an example of using segment light sources in place of point light sources as the unit light sources constituting an original image was described above, besides this, plane light sources may also be used as the unit light sources. For example, in a case of using an original image that is defined as a collection of polygons, each individual polygon may be handled as a plane light source. Obviously in this case, in defining the propagation spaces, spaces that enable the propagation of emitted object light must be defined based on the plane light sources.

Section 5. Embodiments in Which the Reference Light is Not Set

In the pattern computation step in the embodiments described up to now, the interference fringe pattern formed on the recording plane 20 is computed based on the object light, emitted from each individual unit light source constituting an original image, and the reference light. However, in recording the information of the original image as a hologram on the recording plane 20 using the "computer generated hologram" method, the information do not necessarily have to be recorded in the form of an interference fringe pattern. Put in another way, the reference light does not have to be set necessarily.

Generally, in an optical hologram recording method using a silver halide film, because an original image must be recorded as an interference fringe pattern on the silver halide film that is to be the recording plane, a reference light must be prepared in addition to the object light and these two must be made to interfere with each other. However, theoretically, as long as information on the amplitude and phase (complex amplitude) of a synthetic wave, obtained by synthesizing all object light components arriving from an original image, are recorded on the recording plane, the original image can be reproduced. Because by using the "computer generated hologram" method, a complex amplitude pattern that is formed on the recording plane 20 can be determined from the object light by performing a computation based on the amplitude and phase of the arriving light and without setting a reference light, a hologram recording medium can be prepared by forming this complex amplitude pattern in some form on a physical medium.

That is, with the embodiment described in this Section 5, although the same procedures as those of the embodiments described above are performed from the "original image preparation step" of step S1 to the "propagation space definition step" of step S2 and the "recording plane setting step" of step S3 in the flowchart of FIG. 3, the "reference light setting step" of step S4 is unnecessary.

Also, in the "pattern computation step" of step S5, instead of computing an interference fringe pattern, a complex amplitude pattern, which is formed on the recording plane 20 by synthesis of the object light components emitted from the individual unit light sources constituting the respective original images, is computed. Obviously, the point that, in handling the object light components from the respective unit light sources, computation is performed upon deeming that the object light components propagate only within predetermined propagation spaces is exactly the same as that of the embodiments described thus far.

Specifically, the complex amplitude pattern is computed as follows. That is, an object light emitted from an individual point light source constituting an original image is expressed by a formula using the complex number: $A \cdot \exp(-i\omega t + i\phi)$ (where A is the amplitude, $\omega$ is the frequency, t is the time, $\phi$ is the phase, and i is the unit imaginary number), and for the position of a specific computation point C, the sum of these formulae for all object light components that reach the position is determined. The formula expressing this sum is also expressed using the complex number: $A \cdot \exp(-i\omega t + i\phi)$ and indicates complex amplitude information (amplitude information and phase information). A complex amplitude pattern (a distribution pattern of amplitude values and phase values) can thus be obtained on the recording plane 20.

The equation using "$A \cdot \exp(-i\omega t + i\phi)$" contains the time t as a parameter and the amplitude and phase are quantities that vary with time. Thus, in actuality, a specific sampling time point is set (t is provided with an arbitrary value (such as 0)) and the complex amplitude pattern on the recording plane 20 at this sampling time point is determined. Specifically, a process, of defining a plurality of computation points discretely on the recording plane 20, determining the amplitude and the phase of the synthetic object light at the predetermined sampling time point at each computation point position, and thereby determining the complex amplitude pattern as a discrete distribution of amplitudes and phases, is performed.

Meanwhile, in the "pattern forming step" of step S6, the complex amplitude pattern must be formed in place of an interference fringe pattern (contrasting density pattern) on a physical medium. As mentioned above, because the complex amplitude pattern is a pattern having information on both amplitudes and phases, not only an amplitude but a phase must also be recorded on a predetermined position of a physical medium. In addition, in order for a correct hologram reproduction image to be obtained upon illumination of a reproduction illumination light onto the medium, optical modulation that is in accordance with the amplitude and phase recorded at each individual position must be performed on the reproduction illumination light made incident on the medium.

As one method of forming such a complex amplitude pattern on a physical medium, the inventor of the present Application proposes a method of using a plurality of cells with a three-dimensional structure. In summary with this method, a cell, constituted of a three-dimensional structure, is positioned at each individual computation point position of the recording plane 20 and information on the amplitude and the phase of the computation point position corresponding to the cell is recorded in the three-dimensional structure of each individual cell. A specific three-dimensional structure of an individual cell is disclosed, for example, in U.S. Pat. Nos. 6,618,190 and 6,934,074, etc., and detailed description thereof shall be omitted here.

Section 6. Manufacturing Device According to the Present Invention

Lastly, basic arrangements of hologram recording medium manufacturing devices according to the present invention shall be described with reference to the block diagrams of FIGS. 15 and 16. The manufacturing device shown in FIG. 15 is a device for executing steps S1 to S6 shown in the flowchart of FIG. 3 and has a function of manufacturing a hologram recording medium with an arrangement such that different original images are reproduced upon observation from different positions.

Figure 15:
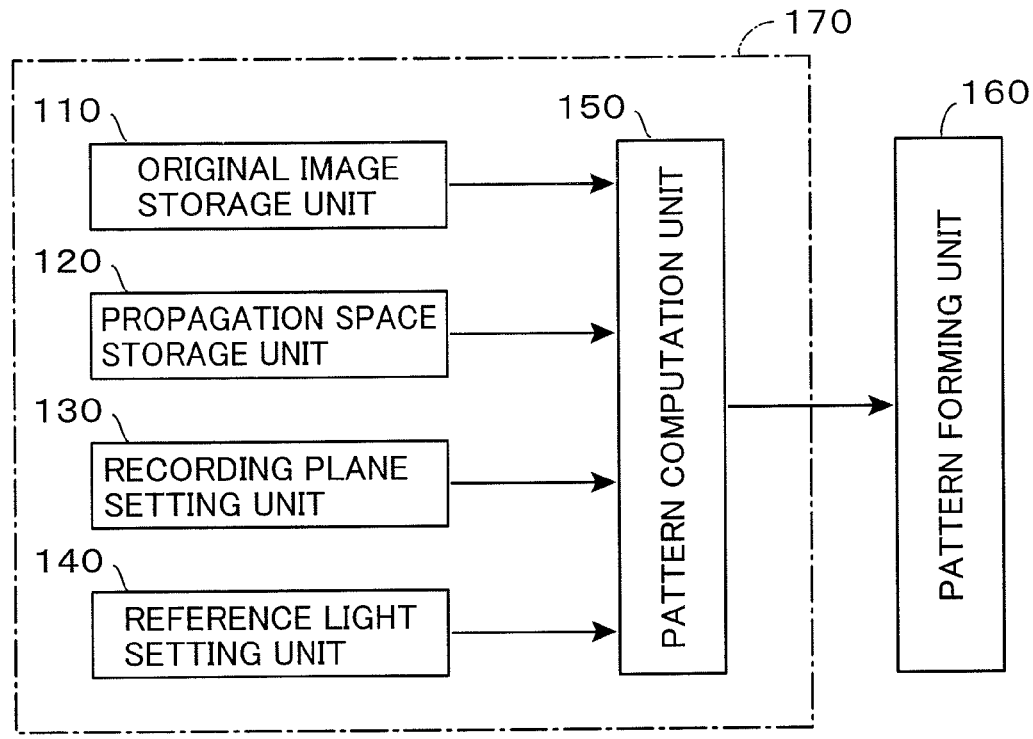
FIG. 15 is a block diagram of a basic arrangement of a hologram recording medium manufacturing device according to the present invention.

In FIG. 15, an original image storage unit 110 is a component for storing the information of the original images prepared in the "original image preparation step" of step S1 and has a function of storing the plurality N of original images respectively as data indicating sets of unit light sources positioned in the XYZ three-dimensional global coordinate system. A propagation space storage unit 120 is a component for storing the information of the propagation spaces defined in the "propagation space definition step" of step S2 and has a function of storing the plurality N of propagation spaces, each enabling propagation of light emitted from a reference unit light source, as data based on the position of the reference unit light source (data indicating a three-dimensional body in the $\alpha\beta\gamma$ three-dimensional local coordinate system). In actuality, both the original image storage unit 110 and the propagation space storage unit 120 are constituted of data storage devices (any of various memories, hard disk devices, etc.) for a computer.

Meanwhile, a recording plane setting unit 130 is a component for executing the "recording plane setting step" of step S3 and has a function of performing a process of setting the predetermined recording plane 20 in the XYZ three-dimensional coordinate system. A reference light setting unit 140 is a component for executing the "reference light setting step" of step S4 and has a function of performing a process of setting the predetermined reference light R in the XYZ three-dimensional coordinate system. In actuality, both the recording plane setting unit 130 and the reference light setting unit 140 can be realized by input devices for a computer and dedicated programs for the setting processes.

A pattern computation unit 150 is a component for executing the "pattern computation step" of step S5 and performs a process of computing an interference fringe pattern formed on the recording plane 20 based on the object light components, emitted from the individual unit light sources constituting the respective original images, and the reference light R. Here, as was described above, the computation is performed upon deeming that an object light from a unit light source, belonging to an i-th (i=1, 2, ..., N) original image, propagates only within an i-th (i=1, 2, ..., N) propagation space, with the position of the unit light source being set as the reference unit light source position. In actuality, the pattern computation unit 150 can be realized by a dedicated program installed in a computer.

Furthermore, a pattern forming unit 160 is a component having a function of forming the interference fringe pattern, determined by the pattern computation unit 150, on a physical medium. Specifically, the pattern forming unit 160 can be arranged from, for example, an electron beam printer and computer that controls it.

Figure 16:
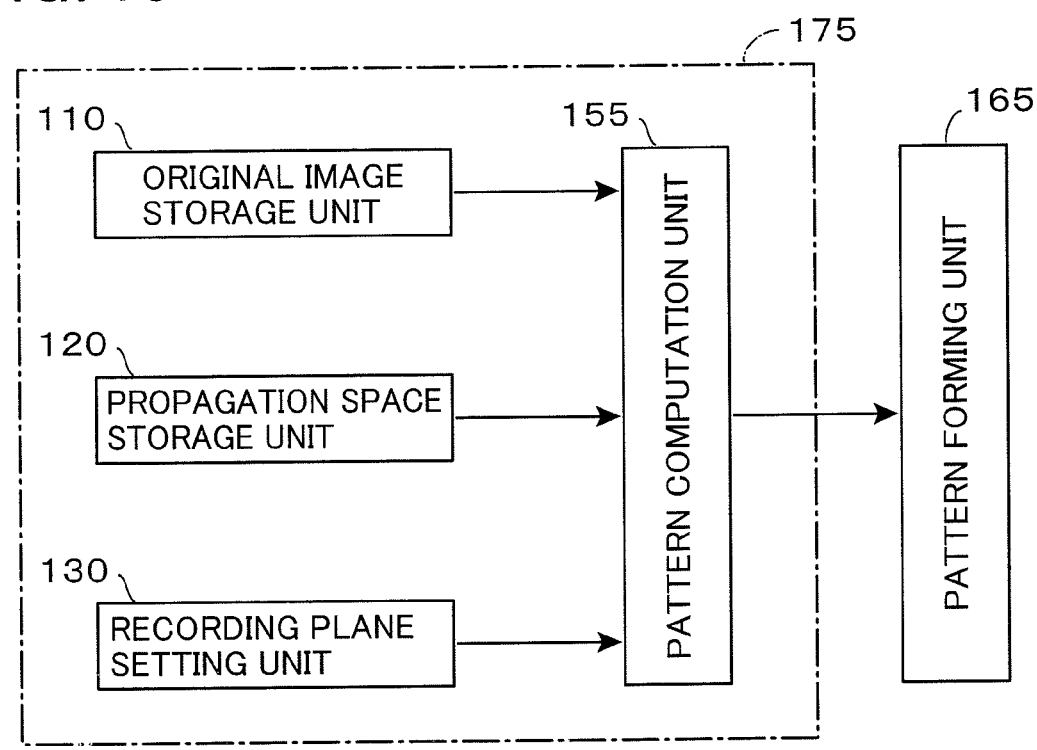
FIG. 16 is a block diagram of another basic arrangement of a hologram recording medium manufacturing device according to the present invention.

Meanwhile, the manufacturing device shown in FIG. 16 is a manufacturing device for carrying out the embodiment of not setting a reference light that was described in Section 5. The original image storage unit 110, the propagation space storage unit 120, and the recording plane setting unit 130 are exactly the same as the respective components shown in FIG. 15. However, the device shown in FIG. 16 does not have the reference light setting unit 140. A pattern computation unit 155 performs a process of computing a complex amplitude pattern (distribution pattern of amplitudes and phases), which is formed on the recording plane 20 by synthesizing the object light components emitted from the individual unit light sources constituting the respective original images, as was described in Section 5. A pattern forming unit 165 performs a process of forming the complex amplitude pattern, determined by the pattern computation unit 155, on a physical medium as was described in Section 5.

For practical use, the components in FIG. 15 that are surrounded by alternate long and short dash lines (the original image storage unit 110, the propagation space storage unit 120, the recording plane setting unit 130, the reference light setting unit 140, and the pattern computation unit 150) can be realized by installing dedicated processing programs in one or a plurality of general-purpose computers 170. Likewise, the components in FIG. 16 that are surrounded by alternate long and short dash lines (the original image storage unit 110, the propagation space storage unit 120, the recording plane setting unit 130, and the pattern computation unit 155) can be realized by installing dedicated processing programs in one or a plurality of general-purpose computers 175.

What is claimed is:

1. A method for manufacturing a hologram recording medium that has an arrangement by which different original images are reproduced when observed from different positions, the hologram recording medium manufacturing method comprising:

an original image preparation step of preparing a plurality of original images, each as a set of unit light sources of point light sources, segment light sources, or plane light sources positioned in a three-dimensional XYZ global coordinate system;

a propagation space definition step of defining a plurality of propagation spaces corresponding to said plurality of original images, respectively, the respective propagation spaces spreading from a reference unit light source positioned in an origin of three-dimension $\alpha\beta\gamma$ local coordinate system;

a recording plane setting step of setting a predetermined recording plane in the XYZ global coordinate system;

a reference light setting step of setting a predetermined reference light in the XYZ global coordinate system;

a pattern computation step of computing an interference fringe pattern, formed on the recording plane, based on object light components, emitted from the individual unit light sources constituting the respective original images, and the reference light; and a pattern forming step of forming the interference fringe pattern on a physical medium; and wherein in the pattern computation step, a computation is performed upon setting an origin of the $\alpha\beta\gamma$ local coordinate system at a position of a respective unit light source defined in the XYZ global coordinate system, overlapping the two coordinate systems so that respective corresponding coordinate axes are parallel, and deeming that an object light from the respective unit light source spreads only within a propagation space corresponding to an original image to which the respective unit light source belongs.

2. A method for manufacturing a hologram recording medium that has an arrangement by which different original images are reproduced when observed from different positions, the hologram recording medium manufacturing method comprising:

an original image preparation step of preparing a plurality of original images, each as a set of unit light sources of point light sources, segment light sources, or plane light sources positioned in a three-dimensional XYZ global coordinate system;

a propagation space definition step of defining a plurality of propagation spaces corresponding to said plurality of original images, respectively, the respective propagation spaces spreading from a reference unit light source positioned in an origin of three-dimensional $\alpha\beta\gamma$ local coordinate system;

a recording plane setting step of setting a predetermined recording plane in the XYZ global coordinate system;

a pattern computation step of computing a complex amplitude pattern formed on the recording plane by synthesis of object light components emitted from the individual unit light sources constituting the respective original images; and a pattern forming step of forming the complex amplitude pattern on a physical medium; and wherein in the pattern computation step, a computation is performed upon setting an origin of the $\alpha\beta\gamma$ local coordinate system at a position of a respective unit light source defined in the XYZ global coordinate system, overlapping the two coordinate systems so that respective corresponding coordinate axes are parallel, and deeming that an object light from the respective unit light source spreads only within a propagation space corresponding to an original image to which the respective unit light source belongs.

\* \* \* \* \*